(12) United States Patent
Pau et al.

(10) Patent No.: US 9,131,163 B2
(45) Date of Patent: Sep. 8, 2015

(54) EFFICIENT COMPACT DESCRIPTORS IN VISUAL SEARCH SYSTEMS

(71) Applicant: STMicroelectronics S.r.l., Agrate Brianza (IT)

(72) Inventors: Danilo Pietro Pau, Sesto San Giovanni (IT); Filippo Malaguti, Agrate Brianza (IT); Luigi Distefano, Agrate Brianza (IT); Samuele Salti, Agrate Brianza (IT); Federico Tombari, Agrate Brianza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 13/762,101

(22) Filed: Feb. 7, 2013

(65) Prior Publication Data
US 2014/0185949 A1    Jul. 3, 2014

Related U.S. Application Data

(60) Provisional application No. 61/596,149, filed on Feb. 7, 2012, provisional application No. 61/596,111, filed on Feb. 7, 2012, provisional application No. 61/596,142, filed on Feb. 7, 2012.

(51) Int. Cl.
| | |
|---|---|
| *G06K 9/46* | (2006.01) |
| *H04N 19/124* | (2014.01) |
| *G06K 9/00* | (2006.01) |
| *G06K 9/62* | (2006.01) |
| *H04N 19/13* | (2014.01) |
| *H04N 19/91* | (2014.01) |

(52) U.S. Cl.
CPC ........ *H04N 7/26079* (2013.01); *G06K 9/00523* (2013.01); *G06K 9/00671* (2013.01); *G06K 9/46* (2013.01); *G06K 9/4671* (2013.01); *G06K 9/6218* (2013.01); *H04N 19/124* (2014.11); *H04N 19/13* (2014.11); *H04N 19/91* (2014.11)

(58) Field of Classification Search
None
See application file for complete search history.

(56) References Cited

U.S. PATENT DOCUMENTS

| | | | |
|---|---|---|---|
| 5,867,386 | A  | 2/1999  | Hoffberg et al. |
| 6,411,724 | B1 | 6/2002  | Vaithilingam et al. |
| 6,618,507 | B1 | 9/2003  | Divakaran et al. |
| 6,646,676 | B1 | 11/2003 | DaGraca et al. |

(Continued)

OTHER PUBLICATIONS

Girod et al, Mobile Visual Search, IEEE Signal Processing Magazine [61] Jul. 2011.*

(Continued)

*Primary Examiner* — Andrae S Allison
(74) *Attorney, Agent, or Firm* — Seed IP Law Group PLLC

(57) ABSTRACT

Disclosed embodiments are directed to methods, systems, and circuits of generating compact descriptors for transmission over a communications network. A method according to one embodiment includes receiving an uncompressed descriptor, performing zero-thresholding on the uncompressed descriptor to generate a zero-threshold-delimited descriptor, quantizing the zero-threshold-delimited descriptor to generate a quantized descriptor, and coding the quantized descriptor to generate a compact descriptor for transmission over a communications network. The uncompressed and compact descriptors may be 3D descriptors, such as where the uncompressed descriptor is a SHOT descriptor. The operation of coding can be ZeroFlag coding, ExpGolomb coding, or Arithmetic coding, for example.

14 Claims, 6 Drawing Sheets

(56) References Cited

U.S. PATENT DOCUMENTS

| | | | |
|---|---|---|---|
| 6,711,293 | B1 | 3/2004 | Lowe |
| 6,778,708 | B1* | 8/2004 | Divakaran et al. ............ 382/236 |
| 6,968,006 | B1 | 11/2005 | Puri et al. |
| 7,143,434 | B1 | 11/2006 | Paek et al. |
| 7,412,427 | B2 | 8/2008 | Zitnick et al. |
| 7,715,475 | B1 | 5/2010 | Puri et al. |
| 8,031,768 | B2* | 10/2011 | Wen ........................ 375/240.03 |
| 8,156,116 | B2 | 4/2012 | Graham et al. |
| 8,306,747 | B1 | 11/2012 | Gagarin et al. |
| 8,447,767 | B2 | 5/2013 | Ah-Pine et al. |
| 8,467,570 | B2 | 6/2013 | Ma et al. |
| 2002/0102020 | A1* | 8/2002 | Qian et al. ..................... 382/165 |
| 2008/0123959 | A1 | 5/2008 | Ratner et al. |
| 2008/0304563 | A1* | 12/2008 | Schoenblum ............ 375/240.03 |
| 2009/0290812 | A1 | 11/2009 | Naaman et al. |
| 2010/0310174 | A1 | 12/2010 | Reznik |
| 2011/0052003 | A1 | 3/2011 | Cobb et al. |
| 2011/0274355 | A1 | 11/2011 | Oami et al. |
| 2012/0002868 | A1 | 1/2012 | Loui et al. |
| 2012/0013491 | A1* | 1/2012 | Chen et al. ....................... 341/67 |
| 2012/0051425 | A1* | 3/2012 | Chong et al. ............ 375/240.12 |
| 2013/0016912 | A1 | 1/2013 | Li et al. |
| 2013/0216135 | A1* | 8/2013 | Pau .............................. 382/190 |
| 2013/0216143 | A1 | 8/2013 | Pasteris et al. |
| 2014/0133550 | A1* | 5/2014 | Pau .......................... 375/240.03 |

OTHER PUBLICATIONS

Tombari et al, A Combined Texture-Shape Descriptor for Enhanced 3D Feature Matching, 2011 18th IEEE International Conference on Image Processing.*

Papakostas, G. A., et al. "An efficient feature extraction methodology for computer vision applications using wavelet compressed Zernike moments." ICGST International Journal on Graphics, Vision and Image Processing, Special Issue: Wavelets and Their Applications SI1 (2005): 5-15.*

Malaguti et al, Toward compressed 3D descriptors, 2012 Second Joint 3DIM/3DPVT Conference: 3D Imaging, Modeling, Processing, Visualization & Transmission.*

P. Papadakis, I. Pratikakis, T. Theoharis, G. Passalis, and S. Perantonis. 3d object retrieval using an efficient and compact hybrid shape descriptor. Eurographics Workshop on 3D Object Retrieval, 2008.*

David G. Lowe, "Distinctive Image Features from Scale-Invariant Keypoints," International Journal of Computer Vision, Jan. 5, 2004, pp. 1-28, vol. 60, No. 2, University of British Columbia, Computer Science Department, Vancouver, B.C., Canada.

Vijay Chandrasekhar et al., "Compressed Histogram of Gradients: A Low-Bitrate Descriptor," International Journal on Computer Vision, May 15, 2011, pp. 1-16, vol. 94, No. 5, University of Stanford, USA.

Bay et al., "Surf: Speeded Up Robust Features," 9th European Conference on Computer Vision, May 7-13, 2006, Graz, Austria, pp. 404-417.

Bodden, "Arithmetic Coding," retrieved from http://www.bodden.de/legacy/arithmetic-coding/, on Mar. 18, 2015, 2 pages.

Brasnett, et al., "A Robust Visual Identifier Using the Trace Transform," Visual Information Engineering Conference 2007, 6 pages.

"Call for Proposals for Compact Descriptors for Visual Search," Requirements Subgroup, International Organisation for Standardisation, Coding of Moving Pictures and Audio, ISO/IEC JTC1/SC29/WG11/N12201, Jul. 2011, Torino, IT, 5 pages.

Calonder et al., "BRIEF: Binary Robust Independent Elementary Features," 11th European Conference on Computer Vision, Sep. 5-11, 2010, Heraklion, Crete, Greece, pp. 778-792.

Chandrasekhar et al., "Survey of SIFT Compression Schemes," Proc. Int. Workshop Mobile Multimedia Processing, 2010, 8 pages.

Chandrasekhar et al., "Transform Coding of Image Features Descriptors," Proc. SPIE7257, Visual Communications and Image Processing, Jan. 18, 2009, San Jose, CA, 725710, 9 pages.

"Description of Test Model under Consideration for CDVS," Video Subgroup, International Organisation for Standardisation, Coding of Moving Pictures and Audio, ISO/IECJTC1/SC29/WG11/N12367, Francini et al., (eds.), Dec. 2011, Geneva, CH, 24 pages.

Euro NCAP Advanced Rewards, retrieved from http://www.euroncap.com/en/ratingsrewards/euro-ncap-advanced-rewards/, on Mar. 18, 2015, 2 pages.

"Evaluation Framework for Compact Descriptors for Visual Search," International Organisation for Standardisation Coding of Moving Pictures and Audio, ISO/IEC JTC1/SC29/WG11/N12202, Jul. 2011, Torino, IT, 14 pages.

Fischler et al., "Random Sample Consensus: A Paradigm for Model Fitting with Applications to Image Analysis and Automated Cartography," Communications of the ACM 24(6):381-395, Jun. 1981.

Hess, "SIFT Library," retrieved from http://blogs.oregonstate.edu/hess/code/sift/, on Mar. 18, 2015, 3 pages.

"Huffman coding," Wikipedia, retrieved from http://en.wikipedia.org/wiki/Huffman_coding, on Mar. 17, 2015, 11 pages.

Jégou et al., "Product quantization for nearest neighbor search," IEEE Transactions on Pattern Analysis and Machine Intelligence 33(1):117-128, Mar. 18, 2010.

Ke et al., "PCA-SIFT: A More Distinctive Representation for Local Image Descriptors," IEEE Computer Society Conference on Computer Vision and Pattern Recognition, Jun. 27-Jul. 2, 2004, pp. 11-506 to II-513.

Lepsøy et al., "Statistical Modelling of Outliers for Fast Visual Search," IEEE International Conference on Multimedia and Expo, Jul. 11-15, 2011, Barcelona, pp. 1-6.

"Low-voltage differential signaling," Wikipedia, retrieved from http://en.wikipedia.org/w/index.php?title=Low-voltage_differential_signaling&printable=yes, on Mar. 18, 2015, 7 pages.

Nistér et al., "Scalable Recognition with a Vocabulary Tree," IEEE Computer Society Conference on Computer Vision and Pattern Recognition, 2006, pp. 2161-2168.

Pau, "Status on UBC's SIFT patent," STMicroelectronics, International Organisation for Standardisation Coding of Moving Pictures and Audio, ISO/IEC JTC1/SC29/WG11 MPEG2012/m23564, Feb. 2012, San Jose, USA, 10 pages.

Renesas Electronics, "Automotive," webpage, retrieved from http://renesas.com/applications/automotive/ on Mar. 18, 2015, 2 pages.

Reznik et al., "Fast Quantization and Matching of Histogram-Based Image Features," Proc. Spie 7798, Applications of Digital Image Processing XXXIII, 77980L, Sep. 7, 2010, 14 pages.

Tombari et al., "A combined texture-shape descriptor for enhanced 3D feature matching," 18th IEEE International Conference on Image Processing, Sep. 11-14, 2011, Brussels, pp. 809-812.

Torralba et al., "Small Codes and Large Image Databases for Recognition," IEEE Conference on Computer Vision and Pattern Recognition, 2008, pp. 1-8.

VLFeat homepage, retrieved from http://vlfeat.org/, on Mar. 18, 2015, 2 pages.

Weiss et al., "Spectral Hashing," from Advances in Neural Information Processing Systems 21, 2008, 8 pages.

Winder et al., "Picking the best DAISY," IEEE Conference on Computer Vision and Pattern Recognition, Jun. 20-25, 2009, Miami, FL, pp. 178-185.

Yeo et al., "Rate-efficient visual correspondences using random projections," 15th IEEE International Conference on Image Processing, Oct. 12-15, 2008, San Diego, CA, pp. 217-220.

Ertöz et al., "Finding Clusters of Different Sizes, Shapes, and Densities in Noisy, High Dimensional Data," SIAM International Conference on Data Mining—SDM, 2003, 12 pages.

Takacs et al., "Outdoors Augmented Reality on Mobile Phone using Loxel-Based Visual Feature Organization," Proceedings of the 1st ACM International Conference on Multimedia Information Retrieval, 2008, pp. 427-434.

Viola et al., "Rapid Object Detection using a Boosted Cascade of Simple Features," Accepted Conference on Computer Vision and Pattern Recognition, 2001, 9 pages.

Yang et al., "Evaluating Bag-of-Visual-Words Representations in Scene Classification," Proceedings of the International Workshop on Multimedia information Retrieval, Sep. 2007, pp. 197-206.

* cited by examiner

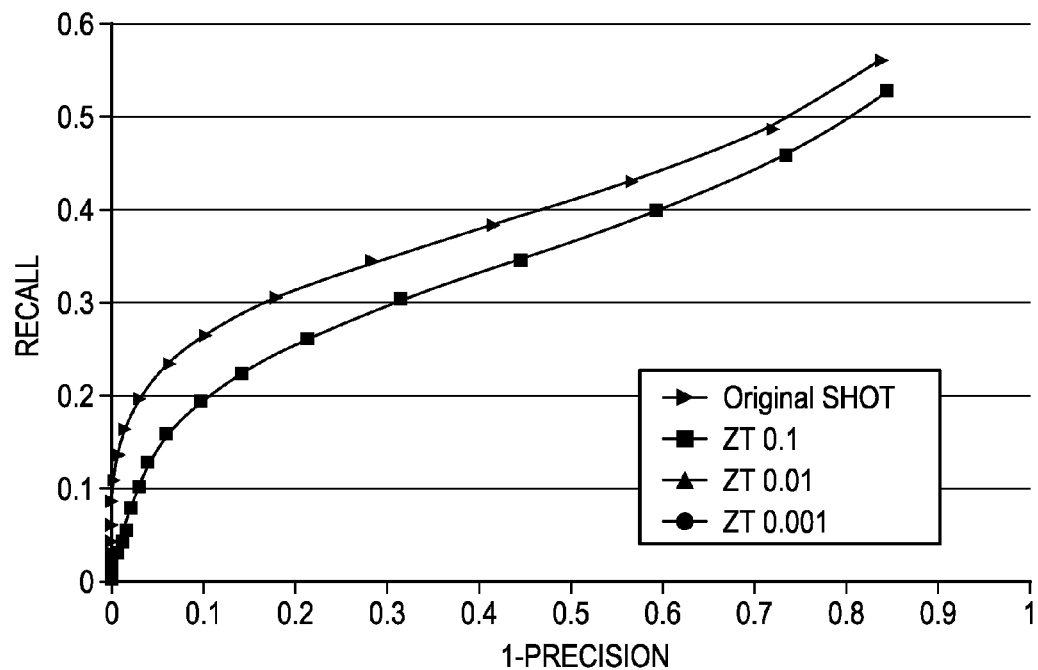
*Fig. 3*
*Fig. 4*
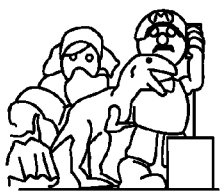
(a) Spacetime
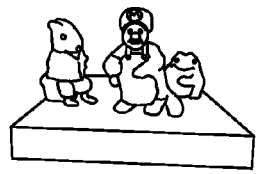
(b) Kinect
(c) Stanford
(d) Virtual Stanford
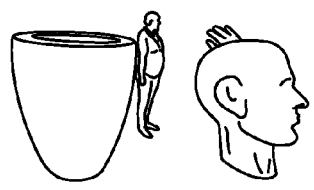
(e) Virtual Watertight

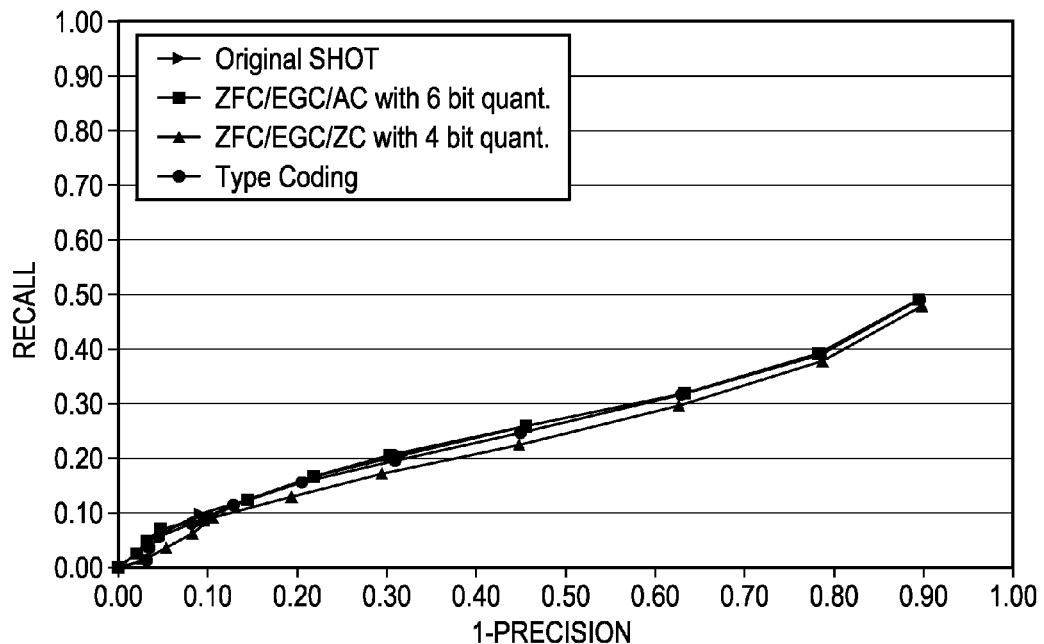
*Fig. 5*    (a) Kinect Dataset
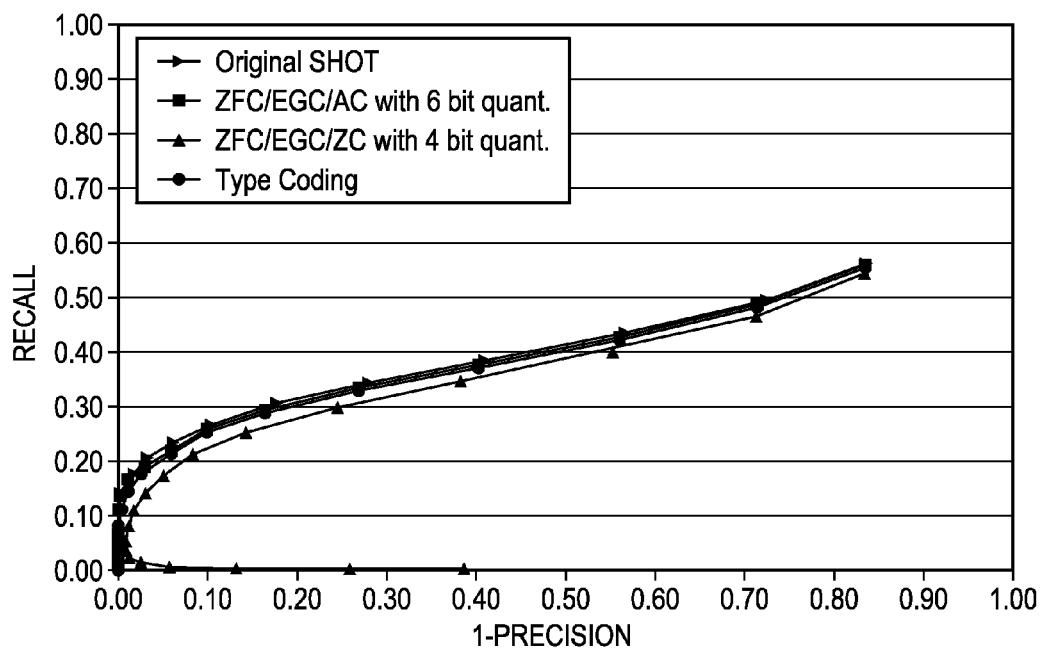
*Fig. 6*    (b) Spacetime dataset

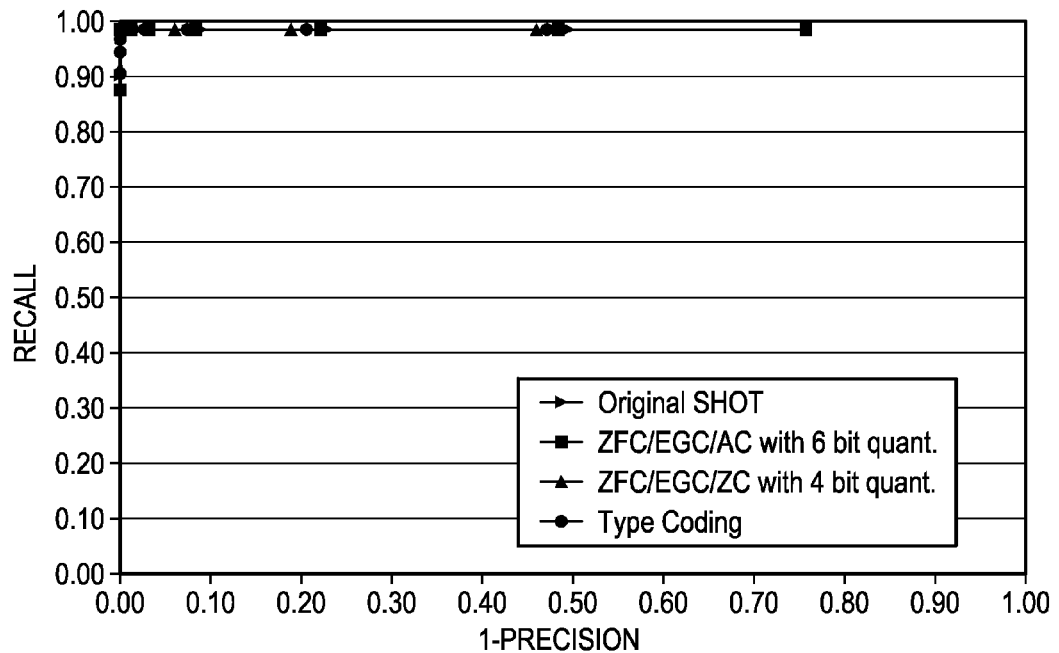
*Fig. 7*   (c) Stanford dataset
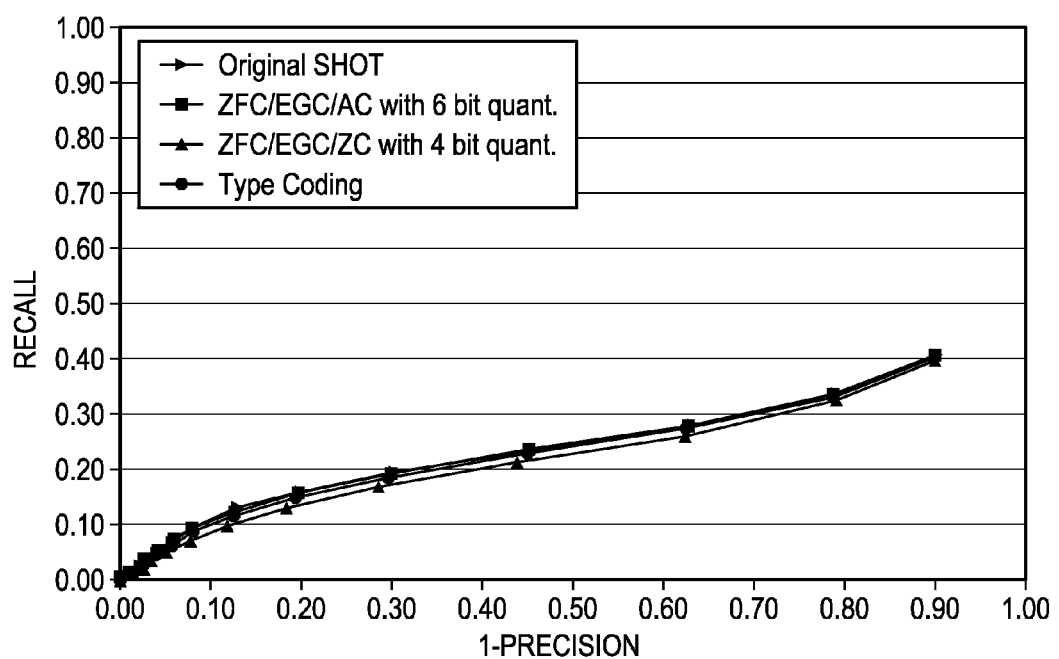
*Fig. 8*   (d) Virtual Stanford dataset

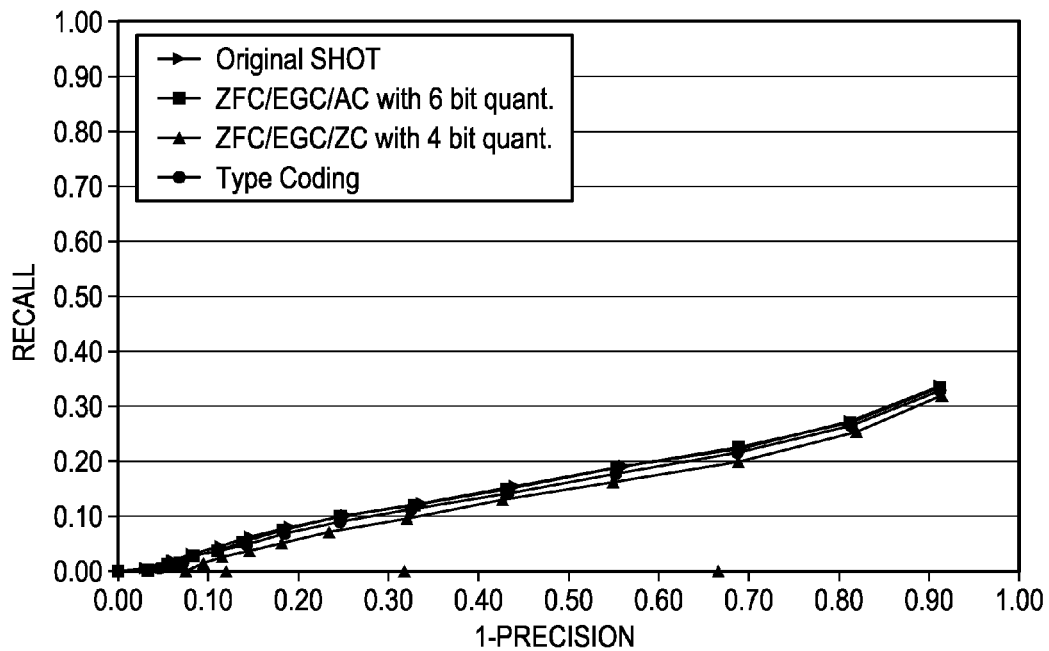
Fig. 9  (e) Virtual Watertight dataset
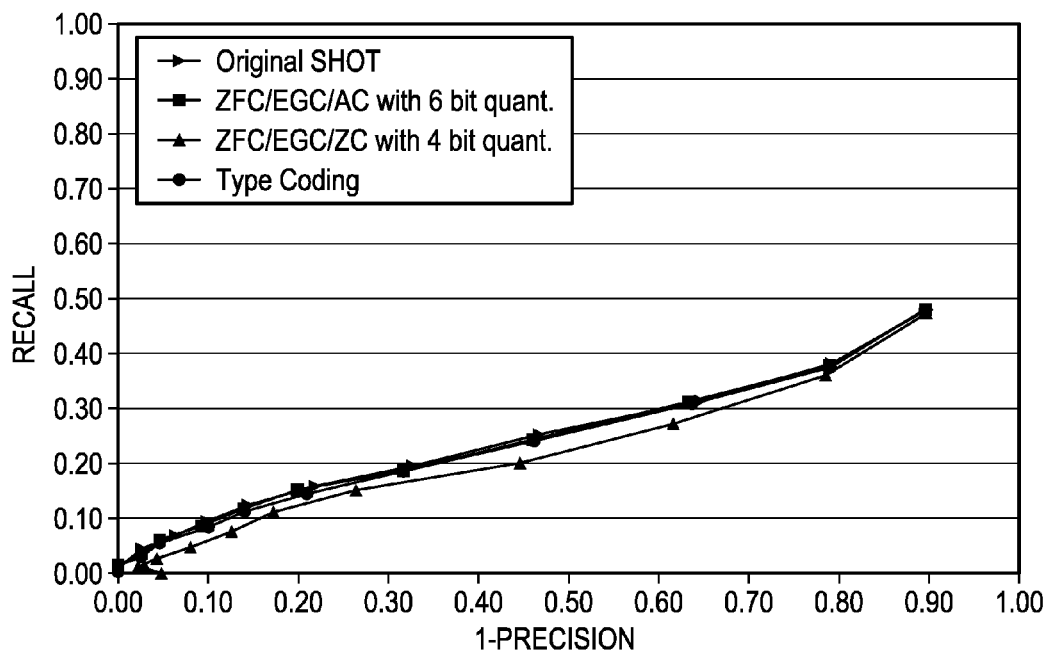
Fig. 10  (a) Kinect dataset

EFFICIENT COMPACT DESCRIPTORS IN VISUAL SEARCH SYSTEMS

PRIORITY CLAIM

The present application claims benefit of U.S. Provisional Patent Application Nos. 61/596,149, 61/596,111, and 61/596,142, all filed Feb. 7, 2012, and all of which are incorporated herein by reference in their entireties.

TECHNICAL FIELD

Embodiments of the present disclosure relate generally to visual search systems and, more specifically, to systems, circuits, and methods for providing compact feature descriptors of an image or object that reduce the bandwidth required to communicate these descriptors in a visual search system.

BACKGROUND

The widespread use of mobile devices equipped with high-resolution cameras is increasingly pushing computer vision applications within mobile scenarios. The common paradigm is represented by a user taking a picture of the surroundings with a mobile device to obtain informative feedback on the surroundings. This is the case, for example, in mobile shopping applications where a user can shop just by taking pictures of desired products, or in landmark recognition applications for ease of visiting places of interest. In the aforementioned scenarios visual search needs to be typically performed over a large image database, where applications on the mobile device communicate wirelessly with a remote server to send visual information and receive informative feedback. As a result, a constraint is set forth by the bandwidth of the communication channel including this wireless communication because the communication channel ought to be carefully optimized to bound communication costs and network latency. For this reason, a compact but informative image representation is sent remotely, typically in the form of a set of local feature descriptors, such as scale-invariant feature transform (SIFT) and speeded up robust features (SURF) feature descriptors, which are extracted from the captured image.

Despite the summarization of image content into local feature descriptors, in at least some applications the size of state-of-the-art feature descriptors cannot meet bandwidth requirements of the communications networks over which these descriptors must be communicated and the desired visual search performed.

SUMMARY

Disclosed embodiments are directed to methods, systems, and circuits of generating compact descriptors for transmission over a communications network. A method according to one embodiment includes receiving an uncompressed feature descriptor, performing zero-thresholding on the uncompressed feature descriptor to generate a zero-threshold-delimited feature descriptor, quantizing the zero-threshold-delimited feature descriptor to generate a quantized feature descriptor, and coding the quantized feature descriptor to generate a compact feature descriptor for transmission over the communications network. The uncompressed and compact feature descriptors may be three-dimensional (3D) feature descriptors, such as where the uncompressed feature descriptor is a Signature of Histograms of OrienTations (SHOT) feature descriptor. The operation of coding can be zero-flag coding, exponential-Golomb (Exp-Golomb) coding, or arithmetic coding, for example.

BRIEF DESCRIPTION OF THE DRAWINGS

FIG. 3 is a graph illustrating the effects of zero-thresholding on SHOT feature descriptors.

FIG. 4 illustrates example scenes utilized in generating experimental datasets utilized in evaluating embodiments disclosed herein.

FIG. 5 is a graph illustrating precision-recall curves utilized in the evaluation of generated compact SHOT feature descriptors for a Kinect dataset and illustrates performance of uncompressed SHOT feature descriptors along with those generated by zero-flag, Exp-Golomb, and arithmetic coding according to embodiments disclosed herein.

FIG. 6 is a graph illustrating precision-recall curves utilized in the evaluation of generated compact SHOT feature descriptors for a space-time dataset and illustrates performance of uncompressed SHOT feature descriptors along with those generated by zero-flag, Exp-Golomb, and arithmetic coding according to embodiments disclosed herein.

FIG. 7 is a graph illustrating precision-recall curves utilized in the evaluation of generated compact SHOT feature descriptors for a Stanford dataset and illustrates performance of uncompressed SHOT feature descriptors along with those generated by zero-flag, Exp-Golomb, and arithmetic coding according to embodiments disclosed herein.

FIG. 8 is a graph illustrating precision-recall curves utilized in the evaluation of generated compact SHOT feature descriptors for a virtual Stanford dataset and illustrates performance of uncompressed SHOT feature descriptors along with those generated by zero-flag, Exp-Golomb, and arithmetic coding according to embodiments disclosed herein.

FIG. 9 is a graph illustrating precision-recall curves utilized in the evaluation of generated compact SHOT feature descriptors for a virtual watertight dataset and illustrates the performance of uncompressed SHOT feature descriptors along with those generated by zero-flag, Exp-Golomb, and arithmetic coding according to embodiments disclosed herein.

FIGS. 10 and 11 are graphs illustrating precision-recall curves for Kinect and Space-time datasets of 3D data including color (i.e., RGB-D data) for the methods of FIG. 2 according to embodiments described in the present disclosure.

DETAILED DESCRIPTION

Visual search for mobile devices relies on transmitting wirelessly a compact representation of the query image (i.e., the captured image to be searched), generally in the form of feature descriptors, to a remote server. Feature descriptors are therefore compacted or compressed so as to reduce bandwidth and network latency in communicating the descriptors. Given the impressive pace of growth of 3D video technology, 3D visual search applications for the mobile and the robotic markets will become a reality. Accordingly, embodiments described herein are directed to compressed 3D feature descriptors, a fundamental building block for such prospective applications. Based on analysis of several compression approaches, different embodiments are directed to the generation and use of a compact version of a state-of-the-art 3D feature descriptor. Experimental data contained herein for a vast dataset demonstrates the ability of these embodiments to achieve compression rates as high as 98% with a negligible loss in 3D visual search performance according to the embodiments described herein.

Figure 1:
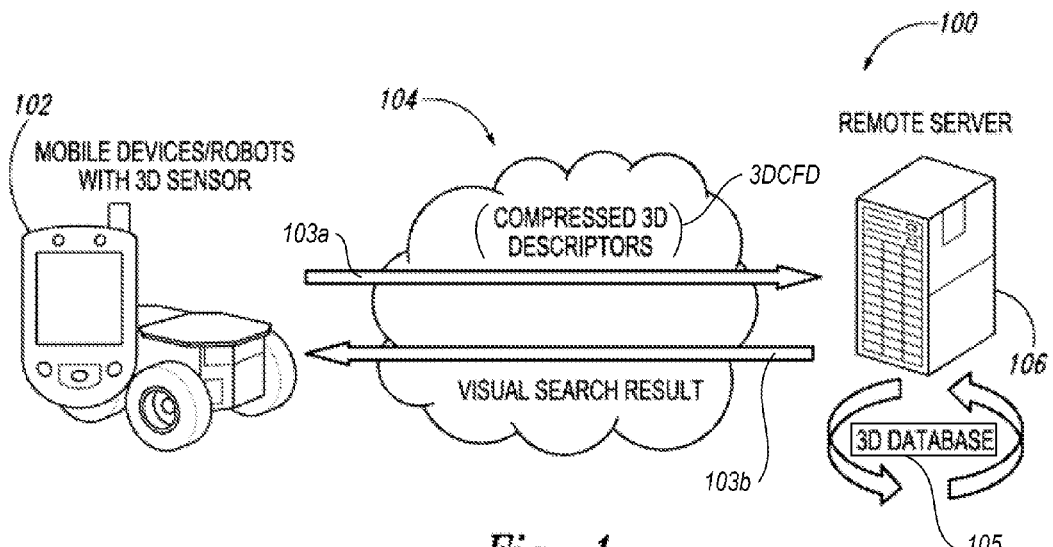
FIG. 1 is a functional block diagram of a visual search system according to one embodiment of the present disclosure.

A representative visual search system 100 is illustrated in FIG. 1 and includes a local image capture device 102, such as a mobile device like a smart phone, and an automobile including two-dimensional or three-dimensional sensors (not shown) for navigation. The local image capture device 102 may also be positioned at a certain location in a city, such as a camera mounted on top of a lamppost at a particular intersection. The local image capture device 102 generates two- or three-dimensional uncompressed feature descriptors for the images of the scene being imaged or captured. These feature descriptors must then be communicated 103a over a communications network 104 to a remote server system 106 containing a visual database 105 that is queried to identify an image corresponding to the local image captured by the device 102 and represented by the communicated descriptors. The remote server system 106 then communicates 103b the visual search results to the device 102 over the communications network 104 for use by the device or a user of the device. Embodiments disclosed herein are directed to methods of compressing these uncompressed feature descriptors generated by the local image capture device 102 so that the bandwidth of the communications network 104 is sufficient to provide the desired operation of the system 100.

Figure 2:
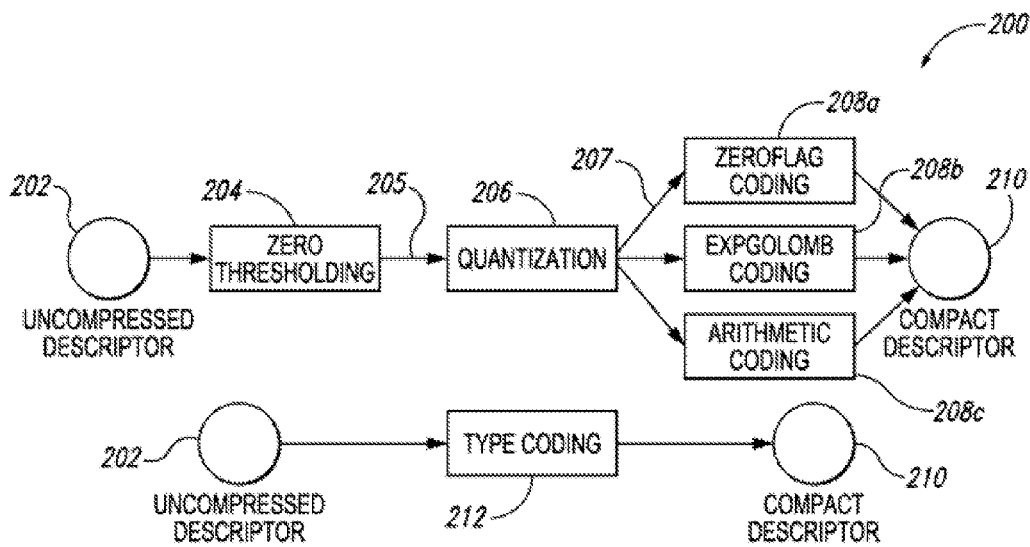
FIG. 2 is functional block diagram illustrating methods of generating compact feature descriptors according to embodiments of the present disclosure.

As illustrated in FIG. 1, the device 102 communicates or provides 103a compressed three-dimensional feature descriptors 3DCPD over the communication network 104 to the remote server system 106. These compressed feature descriptors 3DCFD are generated according to embodiments of a mobile visual search system including compression circuitry 200 as illustrated in FIG. 2. More specifically, as illustrated in FIG. 2 uncompressed feature descriptors 202 are generated by the device 100 (FIG. 1), such as SIFT or SHOT descriptors. A zero-thresholding component 204 then performs zero-thresholding on these feature descriptors 202 to generate zero-threshold-delimited feature descriptors 205, which are provided to a quantization component 206 that quantizes these zero-threshold-delimited feature descriptors to generate quantized feature descriptors 207. The generated quantized feature descriptors 207 are thereafter encoded either by a zero-flag coding component 208a, an Exp-Golomb coding component 208b, or an arithmetic coding component 208c. The zero-flag coding component 208a, Exp-Golomb coding component 208b, and arithmetic coding component 208c each generate compact feature descriptors 210 for communication over the communications network 104 (FIG. 1) according to embodiments described in the present disclosure. The operation of these components is described in more detail below. Alternatively, the uncompressed feature descriptors 202 may be encoded through a type coding component 212 to thereby generate the compact feature descriptors 210.

In the following description, certain details are set forth to provide a sufficient understanding of the present disclosure, but one skilled in the art will appreciate that the disclosure may be practiced without these particular details. Furthermore, one skilled in the art will appreciate that the example embodiments described below do not limit the scope of the present disclosure, and will also understand various modifications, equivalents, and combinations of the disclosed example embodiments and components of such embodiments are within the scope of the present disclosure. Illustrations of the various embodiments, when presented by way of illustrative examples, are intended only to further illustrate certain details of the various embodiments, and should not be interpreted as limiting the scope of the present disclosure. Finally, in other instances below, the operation of well-known components, processes, algorithms and protocols have not been shown or described in detail to avoid unnecessarily obscuring the present disclosure.

A research trend addressing effective compression of feature descriptors has emerged recently, so as to save communication bandwidth while minimizing the loss in descriptive power. Several techniques aimed at feature descriptor compression, also known as compressed or compact descriptors, have been proposed in the literature. The perceived market potential of mobile visual search has also lead to establishment of an Moving Picture Experts Group (MPEG) committee which is currently working on the definition of a new standard focused on "Compact Descriptors for Visual Search" (CDVS).

Techniques for feature detection and description from 3D data have also been proposed in the literature, the topic recently fostered significantly by the advent of accurate and low-cost 3D sensors, such as the Microsoft® Kinect® and the Asus® Xtion®. Popular applications of 3D features include shape retrieval within 3D databases (e.g., Google 3D Warehouse), 3D reconstruction from range views, and recognition and categorization of 3D objects. On the other hand, driven by the developments of 3D video technologies (e.g., 3D movies, 3D televisions, 3D displays), embedded low-cost 3D sensors have started appearing on a number of diverse types of mobile devices. For instance, this is the case for new smartphones and tablets, such as the LG Optimus 3D P920, LG Optimus Pad, HTC EVO 3D and Sharp Aquos SH-12C, as well as game consoles like the 3DS by Nintendo. A study by In-Stat claims that the market for 3D mobile devices is on a steady and fast growth rate, and that by 2015 the market will count more than 148 million such 3D mobile devices. Accordingly, new research is investigating the development of 3D data acquisition technologies specifically conceived for mobile devices. Interestingly, novel technologies for 3D data acquisition are recently being developed for smartphones not equipped with 3D sensors, such as the Trimensional 3D scanning app for Apple and Android devices.

Given the predicted fast development of the 3D ecosystem formed by such 3D mobile devices, it is envisioned the demand for new applications or "apps" that will require querying a 3D database by means of 3D data gathered on-the-fly by mobile device or robots will rapidly grow as well. The architecture or paradigm of these 3D visual search systems will likely adhere to the paradigm of current two-dimensional (2D) visual search applications, like in the example embodiment of the visual search system 100 illustrated in FIG. 1. Proposed scenarios include, for example, the possibility of performing 3D landmark recognition based on a 3D database of buildings, or service robots equipped with 3D sensors relying on a cloud computing infrastructure to infer knowledge about objects in their surroundings.

Key to the foreseen 3D search scenarios is therefore a novel research topic dealing with compact 3D feature descriptors, which ought to be developed to effectively support transmission of the relevant local information in the form of extracted features and feature descriptors related to the 3D scene being captured and then queried. A state-of-the-art 3D descriptor, e.g., the SHOT feature descriptor, is considered and utilized herein by way of example in order to develop several approaches for compressing or compacting such feature descriptors relying on recent data compression techniques.

Experiments on a vast 3D dataset has allowed the identification of the most favorable trade-off between the conflicting requirements of high compression rate and limited performance loss with respect to the original uncompressed feature descriptors in the following embodiments of the present disclosure. As will be seen from the descriptions of these embodiments set forth below, the results or performance of the embodiments turns out quite satisfactory, namely with an average compression rate of around 98% with a negligible loss in performance.

As far as 2D compact feature descriptors are concerned, many techniques proposed to date deal with SIFT feature descriptors. SIFT feature descriptors compression approaches typically include three different categories of compression: 1) hashing; 2) transform coding; and 3) vector quantization. In the first, each feature descriptor is associated with a hash code. These codes are then compared based on their Euclidean or Hamming distance. Examples of such methods are Locality Sensitive Hashing, Similarity Sensitive Coding and Spectral Hashing. Instead, transform coding is a technique used for audio and video compression (e.g., in JPEG compression of digital images). A conventional transform coder takes an input vector X and transforms it into another new vector Y=TX of the same size, then quantizes this new vector to yield a quantized vector Y'. The transformation allows for decorrelating the different dimensions of the original vector X in order to make quantization more effective and reducing the loss in performance due to the quantization. The decoder takes the transformed and quantized vector Y' and applies an inverse transformation to obtain an estimation of the original vector X. Examples of transform coding schemes include the Karhunen-Loeve Transform and the ICA Transform, as will be appreciated by those skilled in the art. Finally, compression based on vector quantization subdivides the descriptor space into a fixed number of bins (i.e., a codebook) using clustering techniques such as the k-means algorithm. Successively, instead of a feature descriptor, its associated codeword ID can be sent. Two examples are Product Quantization and Tree Structured Vector Quantization. Although generally able to yield small distortions of the original signal, the main disadvantage of such approaches is that the codebook must be present at both the encoder (i.e., mobile device 102) and the decoder side (i.e., remote server system 106). This scenario requires the codebook to be stored on the mobile device 102 and transmitted, which could be cumbersome due to its size being often times considerably large. Moreover, if the codebook is modified at run-time, it requires an additional transmission overhead to keep the synchronization between encoder (mobile device 102) and decoder (remote server system 106). Another possibility deals with the use of a data-independent codebook, such as in Type Coding. In this case, the codebook is based on a regular grid defined over the descriptor space, which usually implies more distortion but does not require local storage of the codebook nor any synchronization overhead.

Alternatively to SIFT feature descriptors, one of the most famous compact feature descriptors is Compressed Histogram of Gradients (CHoG), which reported the best trade-off between compression rate and visual search performance when compared to other compact feature descriptors. To build the CHoG feature descriptor, first an Uncompressed Histogram of Gradients (UHoG) feature descriptor is extracted, which, like SIFT, is a vector of histograms of gradient orientations, but carries out spatial binning according to a DAISY configuration instead of a 4×4 square grid. Successively, UHoG feature descriptors are compressed by means of Type Coding to end up with the CHoG feature descriptors.

The SHOT feature descriptor encodes a signature of histograms of topological traits. A 3D spherical grid of radius r, made out of 32 sectors, is centered at the keypoint to be described and oriented according to a unique local reference frame which is invariant with respect to rotations and translations. For each spherical grid sector, a one-dimensional histogram is computed, built up by accumulating the cosine-discretized into $b_s$ bins—of the angle between the normal at the keypoint and the normal of each of the points belonging to the spherical grid sector for which the histogram is being computed. The final descriptor is then formed by orderly juxtaposing all histograms together according to the local reference frame. To better deal with quantization effects, quadrilinear interpolation is applied to each accumulated element. Finally, to improve robustness with respect to point density variations, the descriptor is normalized to unit length. When color information is available together with depth, as is the case of RGB-D data provided by the Kinect sensor, an additional set of histograms can be computed, where the $L_1$ norm between the color triplet of the center point and that of each point of the current spherical grid sector is accumulated in each histogram, quantized into $b_c$ bins (usually $b_c \neq b_s$). The SHOT code for generating SHOT feature descriptors is publicly available as a stand-alone library, as well as part of the open source Point Cloud Library.

As previously mentioned, prior proposals investigate compression schemes suitable for achieving compact 3D feature descriptors. In embodiments of the present disclosure, several state-of-the-art algorithms have been analyzed for data compression and four approaches have been derived corresponding to the four embodiments shown in FIG. 2. The first three embodiments shown in the top portion of FIG. 2 share zero thresholding (ZT) followed by quantization, where these two steps aim at reducing the redundancy of each feature descriptor element and they are both lossy (i.e., the introduced compression cannot be reversed). Successively, a lossless compression algorithm is then applied to the resulting quantize feature descriptor 207 (FIG. 2), where this lossless compression is either zero-flag coding, Exp-Golomb coding, or arithmetic coding as seen in FIG. 2, which reduces the redundancy in the sequence of elements stored in each quantized feature descriptor 207. In addition, a fourth embodiment is based on type coding of the quantized feature descriptors 207, where type coding is the compression algorithm deployed by CHoG feature descriptors.

Zero thresholding utilizes the intuition that, generally, 3D surfaces intersect only a limited portion of a volumetric neighborhood around a keypoint, suggests that a number of proposed 3D descriptors are often quite sparse (i.e., with many values equal or close to zero). Keypoints are salient interest points in a captured image, as will be appreciated by those skilled in the art. This is, indeed, the case for SHOT feature descriptors, for which experimental verification of this intuition has been done by the present inventors, finding that typically more than 50% of the elements are null. This characteristic may be exploited by a lossless compression step (i.e., by using just a few bits to encode each of the zero values). Moreover, the inventors have discovered that it turns out to be even more effective to threshold to zero also those elements having small values, where this operation is referred to as zero thresholding (ZT), as will be discussed in more detail below.

Table I shows the percentage of elements that are less than or equal to a given threshold Th within a set of SHOT feature descriptors extracted from the two datasets that will be presented below, namely Kinect and Spacetime datasets.

TABLE I

| Th. | Null Elements | |
|---|---|---|
| | Kinect | Spacetime |
| 0 | 57.67% | 72.16% |
| 0.00001 | 57.95% | 72.44% |
| 0.0001 | 59.38% | 72.73% |
| 0.001 | 64.49% | 75.57% |
| 0.01 | 76.70% | 83.52% |
| 0.1 | 93.47% | 94.89% |

As demonstrated by Table I, a threshold Th equal to 0.01 yields a percentage of null elements as high as 83% in the Spacetime dataset, while thresholding at 0.1 allows the percentage to reach 94%. However, it was observed (see, e.g., FIG. 3) that while the value of the first threshold Th does not noticeably affect the performance of the SHOT feature descriptors, the second threshold (i.e., the threshold used by the quantization component 206) causes a significant performance deterioration. Thus, the zero threshold ZT threshold of the zero thresholding component 204 was set to 0.01.

Regarding quantization, the original SHOT feature descriptors represent each element as a double precision floating-point number. Given the SHOT feature descriptors normalization step, which results in all its elements having a value between 0 and 1, it is possible to quantize each value with a fixed number of bits, thus reducing the feature descriptor size. Since it was found that the feature descriptor performance starts to deteriorate when using less than 4 bits for the quantization step, the analysis and experiments were carried out using 6 and 4 bits for each value in a feature descriptor. It is worth noting that depending on the coarseness of the quantization, this step can also account for the previous zero threshold ZT step (e.g., this occurs in the case of 4 bits where all values smaller than 1/32 are quantized to 0).

The present inventors determined that zero-flag coding may also be used as a way to exploit the usually high number of null values present in the feature descriptors, especially after zero-thresholding on such descriptors has been performed. Zero-flag coding effectively encodes sequences of "zeros" by means of an additional flagbit, F, which is inserted before every element different from zero or every sequence of zeros. The flag bit F is inserted according to the following rules: flag bit F=1 means that the next element is not zero, and it is followed by a fixed number of bits representing the quantized value of this element. Conversely, flag bit F=0 means that the next element is a sequence of zeros, and it is followed by a fixed number of bits indicating the length of the sequence of zeros. This approach requires specifying the maximum length of a zero sequence. The inventors determined that good performance was obtained with a value of the maximum length of the sequence of zeros being equal to 16, allowing 5 bits to be used to encode each sequence of zeros where the 5 bits include the 1 flag bit F plus 4 bits required to encode the length of the sequence having a maximum value of 16 (i.e., 1111). With this approach a sequence of zeroes longer than 16 elements is split into multiple sequences, each having a maximum length of 16.

Exp-Golomb Coding is a compression algorithm allowing the use of a few bits to represent small values, the number of required bits increasing with increasing numerical values. The algorithm is controlled by a parameter k, which the based on the inventor's investigation was set to 0 so that each null element, which as previously discussed the inventors determined are particularly frequent in SHOT feature descriptors, especially after zero-thresholding, is represented by just one bit in the compressed feature descriptor.

The idea behind arithmetic coding is to represent highly frequent values with a few bits, the number of bits increasing as the symbol becomes less frequent or less probable. Frequencies can be estimated through a training stage where the probability distribution associated with symbols is learned. Alternatively, they can also be learned without a specific training stage in an adaptive manner, where at the beginning all symbols have the same probability and then each frequency is updated every time a symbol is encoded or decoded. In this last case, there is no overhead due to initial codebook synchronization between encoder and decoder. The inventors utilized the adaptive version of the arithmetic coding algorithm since it is more generally applicable, due to a training stage not being feasible in several application scenarios related to 3D visual search feature descriptors. A detailed explanation of the arithmetic coding algorithm can be found in the prior art along with the implementation of the adaptive version of the algorithm used herein.

Given an m-dimensional symbol, s, type coding associates its nearest neighbor q over a regular m-dimensional lattice. Hence, the index associated with q is transmitted instead of the symbol s itself. The lattice can be built such that the structure is independent of the data so that the type coding does not require storage and transmission of any codebook. Besides the parameter m, type coding relies on another parameter, n, which is used to control the number of elements constituting the lattice, so that the total number of elements in the lattice coincides with the number of partitions of parameter n into m terms according to the following multiset coefficient:

$$\left(\binom{m}{n}\right) = \binom{m+n-1}{m-1} \quad (1)$$

The number of bits needed to encode each index is at most:

$$\left\lceil \log_2\left(\binom{m}{n}\right)\right\rceil \approx (n-1)\log_2 n \quad (2)$$

In experimenting with type coding, the approach of subdividing SHOT feature descriptors into equally sized sub-vectors and then applying type coding to compress each of these sub-vectors was used. Type coding requires the elements of the feature descriptor to be encoded to sum up to 1 so a set of required normalization factors associated with each sub-vector were appended at the end of the compressed feature descriptor. Finally, an array formed by these normalization factors is also $L_1$ normalized between 0 and 1, and then quantized with 8 bits to reduce its storage (this last normalization factor need not be stored). This allows the normalization step to be reversed at the end of the decoding stage with a limited loss due to normalization factor compression, as otherwise the information content of the feature descriptor would be distorted by the different normalization factors.

A SHOT feature descriptor consists of 32 histograms so the performance of type coding was evaluated by combining them into sub-vectors consisting of k histograms, with k equal to 1, 2, 4, 8 or 16. Considering, for instance, parameter $b_s$ equal to 10, then parameter m in Equation (1) can be set to $k \times (b_s+1)$, where $k=1, \ldots, 16^8$. From Equation (2) it is possible to determine the size of the compact feature descriptor, and thus the overall compression rate, for different parameter choices.

Table II shows data obtained by choosing, for each value of m, the value of n that minimizes the accuracy loss with respect to the uncompressed SHOT feature descriptor. It can be seen in Table II that the choice m=176, n=100 (i.e., k=16) provides the highest compression rate.

TABLE II

| m | n | Bit size | Compression rate |
|---|---|---|---|
| 11 | 40 | 1344 | 94.03% |
| 22 | 20 | 736 | 96.73% |
| 44 | 60 | 848 | 96.24% |
| 88 | 100 | 764 | 96.61% |
| 176 | 100 | 528 | 97.66% |

Therefore, the experiments used these values so as to favor compactness of the feature descriptor. However, it is worth pointing out that: i) the computational complexity and thus the encoding and decoding time of type coding grows with m and n; and ii) the algorithm uses, internally, integers represented with a large number of bits, which may in some embodiments be difficult to handle both in software as well as in hardware. With the choice m=176, n=100, the resulting feature descriptor consists of two 256 bit integers and to handle them a specific software library for large sized-integers was used, which causes a significant increase of the computational burden. As for experiments including color information, m and n have been set according to the same principle, in particular, m=16×($b_s$+1) for the shape part and m=16×($b_c$+1) for the color part, and n=100.

The described approaches for achieving compact 3D feature descriptors are evaluated and compared here in terms of performance and compression rate with respect to the uncompressed SHOT feature descriptors. The cases of a 3D data as well as that of RGB-D data are also described herein.

Experiments were carried out over five different datasets, two of which also contain color information and will be used in the experiments concerning RGB-D descriptors. Three of these datasets are those that were originally used in the experimental evaluation of SHOT descriptors, namely: 1_Spacetime dataset containing 6 models and 15 scenes acquired with the Spacetime Stereo technique; 2) Kinect dataset containing 6 models and 17 scenes acquired with a Microsoft Kinect device; and the Stanford dataset containing 6 models and 45 scenes built assembling 3D data obtained from the Stanford repository.

Two additional datasets, namely Virtual Stanford and Virtual Watertight, were built using, respectively, 6 models from the Stanford repository and 13 models from the Watertight dataset. The scenes in these datasets have been created by randomly placing 3 to 5 models close to each other and then rendering 2.5D views in the form of range maps, with the aim of mimicking a 3D sensor such as the Kinect device. To this end, a Kinect simulator was used which first generates depth-maps from a specific vantage point by ray casting, then adds Gaussian noise and quantizes the z-coordinates, with both the noise variance and the quantization step increasing with distance. Finally, applied bilateral filtering was applied to the depth maps to reduce noise and quantization artifacts.

All these datasets include, for each scene, ground-truth information (i.e. the list of model instances present in the scene, together with their rotation and translation with respect to the original model). FIG. 4 shows sample scenes or objects from each dataset.

To evaluate the performance of the compact feature descriptors, the process first extracts a predefined number of keypoints from each model via random sampling and then relies on ground-truth information to select the scene points that exactly match those extracted from models. To simulate the presence of outliers, the process randomly extracts a pre-defined number of keypoints from clutter, which do not have a correspondent among the models. For each keypoint, the SHOT feature descriptor is computed. For the SHOT parameters, the size of the radius r and the number of shape and color bins ($b_s$ and $b_c$) were tuned so as to adapt them to the specific characteristics of the dataset. The tuned values, listed in Table III, are used by all the considered compact feature descriptors.

TABLE III

| Data | Dataset | $b_S$ | $b_C$ | r | bits |
|---|---|---|---|---|---|
| Shape-only | Kinect | 10 | — | 30 | 22528 |
|  | Spacetime | 10 | — | 15 | 22528 |
|  | Stanford | 10 | — | 15 | 22528 |
|  | Virtual Stanford | 10 | — | 60 | 22528 |
|  | Virtual Watertight | 10 | — | 60 | 22528 |
| Shape + Color | Kinect | 15 | 5 | 30 | 45056 |
|  | Spacetime | 10 | 30 | 15 | 86016 |

After computation of the feature descriptors, each vector is first encoded and then decoded. This is done also for the models feature descriptors so as to account for the distortions brought in by or resulting from compression. Successively, the matching stage compares the feature descriptors extracted from each model to those identified in each scene based on the Euclidean distance in the descriptor space. More precisely, feature descriptors are matched based on the ratio of distances criterion in one embodiment. Correspondences are then compared with the ground-truth to compute the number of "True Positives" and "False Positives" at different values of the matching threshold, thus attaining Precision-Recall curves. It is important to point out that, as shown in FIG. 2, the three compact descriptors based on zero-flag, Exp-Golomb and arithmetic coding have identical performance (i.e. identical Precision-Recall curves) due to their lossy stages being exactly the same. Accordingly, a single Precision-Recall curve is plotted for the three methods, and compared in terms of their different compression rates.

FIGS. 5-9 show the Precision-Recall curves for the evaluation of compact SHOT feature descriptors on the five datasets using 3D shape information only. In particular, each graph reports the performance of the uncompressed SHOT feature descriptor, which is designated Original SHOT in each graph, together with the performance provided by zero-flag coding (ZFC), Exp-Golomb coding (EGG) and arithmetic coding (AC) using 6 and 4 bits for quantization as well as by Type Coding. Table IV shows the achieved compression rates.

TABLE IV

|  | ZFC | | EGC | | AC | | |
|---|---|---|---|---|---|---|---|
|  | 6-bits | 4-bits | 6-bits | 4-bits | 6-bits | 4-bits | TC |
| Kinect | 97.18 | 97.79 | 97.27 | 97.97 | 97.78 | 98.80 | 97.66 |
| Spacetime | 97.52 | 98.02 | 97.43 | 98.03 | 98.05 | 98.92 | 97.66 |
| Stanford | 95.77 | 96.77 | 96.67 | 97.77 | 96.94 | 98.47 | 97.66 |
| Virtual Stanford | 97.12 | 97.75 | 97.25 | 97.96 | 97.73 | 98.79 | 97.66 |
| Virtual Watertight | 97.56 | 98.06 | 97.46 | 98.03 | 98.07 | 98.95 | 97.66 |
| Avg. | 97.03 | 97.68 | 97.22 | 97.95 | 97.71 | 98.79 | 97.66 |

These results show that zero-flag, Exp-Golomb, and arithmetic coding using 6 bit quantization as well as Type Coding are notably effective, achieving high compression rates of between 96% and 98% with a negligible loss in performance compared to the uncompressed SHOT feature descriptors (i.e., Original SHOT). Among the compared approaches, arithmetic coding AC and Type Coding yield the best compression rates, with arithmetic coding based on 6 bit quantization performing slightly better than Type Coding (average compression rate 97:71% vs. 97:66%). Moreover, as discussed previously, Type Coding with parameters tuned to achieve a performance level comparable to arithmetic coding AC turns out to be significantly less efficient but may be suitable in some embodiments. In particular, with our implementation, encoding with Type Coding is on the average between 3 and 4 times slower than encoding with zero-thresholding quantization and arithmetic coding AC (i.e. 0:26 ms vs. 0:07 ms per feature descriptor), while decoding can be up to two orders of magnitude slower (i.e. 0:58 ms vs. 0:05 ms per feature descriptor). Therefore, the pipeline including the components 204, 206 and 208c based on arithmetic coding seems the preferred choice to attain a compact SHOT feature descriptor for 3D shape data.

Figure 11:
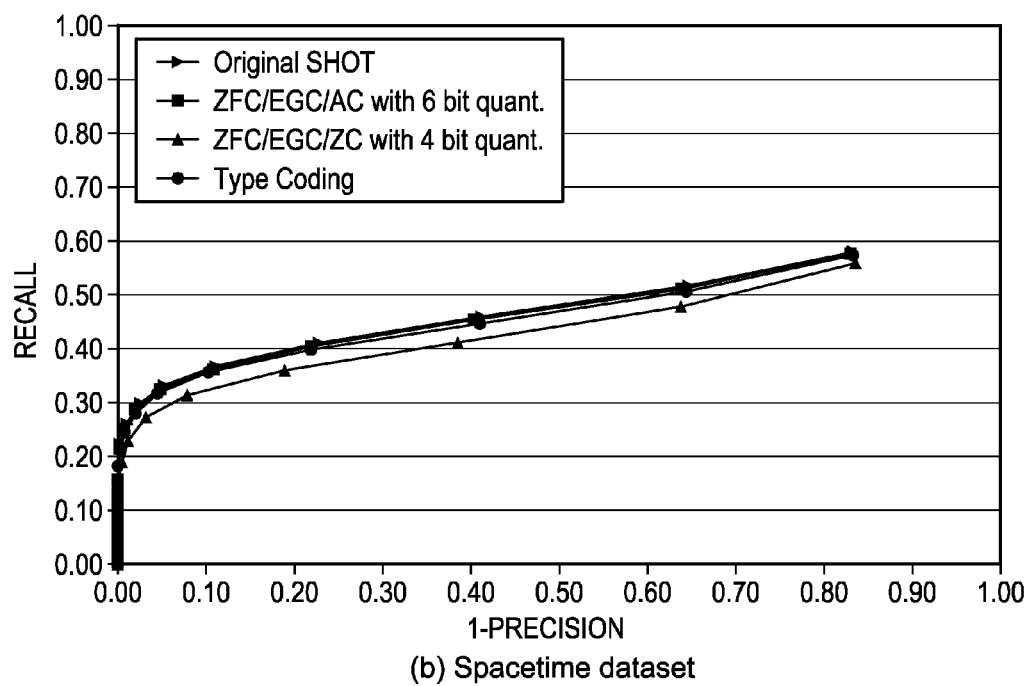

These findings are confirmed by the results of the experiments on RGB-D data (i.e., using both 3D shape and color), as shown in FIGS. 10 and 11 and Table V shown below.

TABLE V

|  | ZFC | | EGC | | AC | | |
| --- | --- | --- | --- | --- | --- | --- | --- |
|  | 6-bits | 4-bits | 6-bits | 4-bits | 6-bits | 4-bits | TC |
| Kinect | 97.63 | 98.12 | 97.61 | 98.13 | 98.24 | 99.13 | 97.75 |
| Spacetime | 98.51 | 98.77 | 97.98 | 98.27 | 98.92 | 99.45 | 98.47 |
| Avg. | 98.07 | 98.45 | 97.80 | 98.20 | 98.58 | 99.29 | 98.11 |

Again, 6-bit zero-flag coding (ZFC), Exp-Golomb coding (EGC) and arithmetic coding (AC), as well as Type Coding (TC) exhibit a performance level indistinguishable from the uncompressed SHOT feature descriptors while providing excellent compression rates. Also with RGB-D data, 6-bit arithmetic coding AC seems the best compact feature descriptor, due to its higher average compression rate (i.e., 98:58% vs. the 98:11% of Type Coding) and lower computational complexity with respect to Type Coding.

Finally, experiments used a state-of-the-art 3D keypoint detector instead of random sampling. The results confirmed the trend related to random keypoint selection, as regards both compression rates as negligible accuracy loss with respect to the uncompressed descriptor.

The above embodiments demonstrate how the use of suitable compression techniques can greatly reduce the redundancy of a state-of-the-art 3D feature descriptor, providing dramatic shrinking of the feature descriptor size with a negligible loss in performance. Among considered compression techniques, the approach based on arithmetic coding is preferable to Type Coding, the latter being the compression method deployed by the most popular image feature descriptor (i.e., CHoG). A key intuition behind the devised compression pipelines deals with leveraging the sparsity of the considered 3D feature descriptor, a feature that is likely to be advantageous also with several other 3D feature descriptors relying on a volumetric support. Embodiments described herein may be used for searching and knowledge discovering in large remote image databases given query 3D data sensed by next generation mobile devices and robots.

One skilled in the art will understand that even though various embodiments and advantages of the present disclosure have been set forth in the foregoing description, the above disclosure is illustrative only, and changes may be made in detail, and yet remain within the broad principles of the disclosure. For example, many of the components described above may be implemented using either digital or analog circuitry, or a combination of both, and also, where appropriate, may be realized through software executing on suitable processing circuitry. It should also be noted that the functions performed can be combined to be performed by fewer elements or process steps depending upon the actual embodiment being used in the system 100 of FIG. 1. Therefore, the present disclosure is to be limited only by the appended claims.

What is claimed is:

1. A method of generating compact feature descriptors for transmission over a communications network in a mobile visual search system, the method comprising:
   receiving an uncompressed three-dimensional feature descriptor;
   performing zero-thresholding on the uncompressed three-dimensional feature descriptor to generate a zero-threshold-delimited three-dimensional feature descriptor;
   quantizing the zero-threshold-delimited three-dimensional feature descriptor to generate a quantized three-dimensional feature descriptor; and
   coding the quantized three-dimensional feature descriptor to generate a compact three-dimensional feature descriptor for transmission over the communications network in the mobile visual search system.

2. The method of claim 1, wherein the uncompressed three-dimensional feature descriptor comprises a SHOT feature descriptor.

3. The method of claim 1, wherein the operation of coding comprises zero-flag coding.

4. The method of claim 1, wherein the operation of coding comprises Exp-Golomb coding.

5. The method of claim 1, wherein the operation of coding comprises arithmetic coding.

6. The method of claim 1, wherein the operation of coding comprises type coding.

7. A method of generating compact feature descriptors for transmission over a communications network in a visual search system, the method comprising:
   receiving an uncompressed SHOT feature descriptor;
   performing zero-thresholding on the uncompressed SHOT feature descriptor to generate a zero-threshold-delimited SHOT feature descriptor;
   quantizing the zero-threshold-delimited SHOT feature descriptor to generate a quantized SHOT feature descriptor; and
   coding the quantized SHOT feature descriptor using arithmetic coding to generate a compact SHOT feature descriptor for transmission over the communications network.

8. The method of claim 7, wherein the coding operation comprises 6-bit arithmetic coding.

9. The method of claim 8, wherein the coding operation achieves a compression rate of the uncompressed SHOT feature descriptors of at least 96%.

10. The method of claim 7, wherein the coding operation comprises 4-bit arithmetic coding.

11. A method of generating compact feature descriptors for transmission over a communications network in a mobile visual search system, the method comprising:

receiving an uncompressed three-dimensional feature descriptor; and type coding the uncompressed three-dimensional feature descriptor to generate a compressed three-dimensional feature descriptor for transmission over the communications network, the type coding including:

subdividing each of the quantized three-dimensional feature descriptors into a number of equally sized sub-vectors;

type coding each of these sub-vectors to generate encoded sub-vectors having a sum that equals 1; and appending to each compressed three-dimensional feature descriptor formed by the corresponding number of encoded sub-vectors a set of required normalization factors associated with each of the sub-vectors.

12. The method of claim 11, wherein the sets of normalization factors for the sub-vectors form an array of normalization factors, and wherein this array of normalization factors is also L1 normalized between 0 and 1 and then quantizing the array of normalization factors that is also L1 normalized.

13. The method of claim 12, wherein the quantizing of the array of normalization factors that is also L1 normalized comprises quantizing this array with 8 bits.

14. The method of claim 11, wherein the normalization factors are appended to the end of the compressed three-dimensional feature descriptor.

* * * * *